(No Model.)
E. C. WILLEY.
GAGE FOR MEASURING DIAMETERS OF CYLINDERS.
No. 355,365. Patented Jan. 4, 1887.
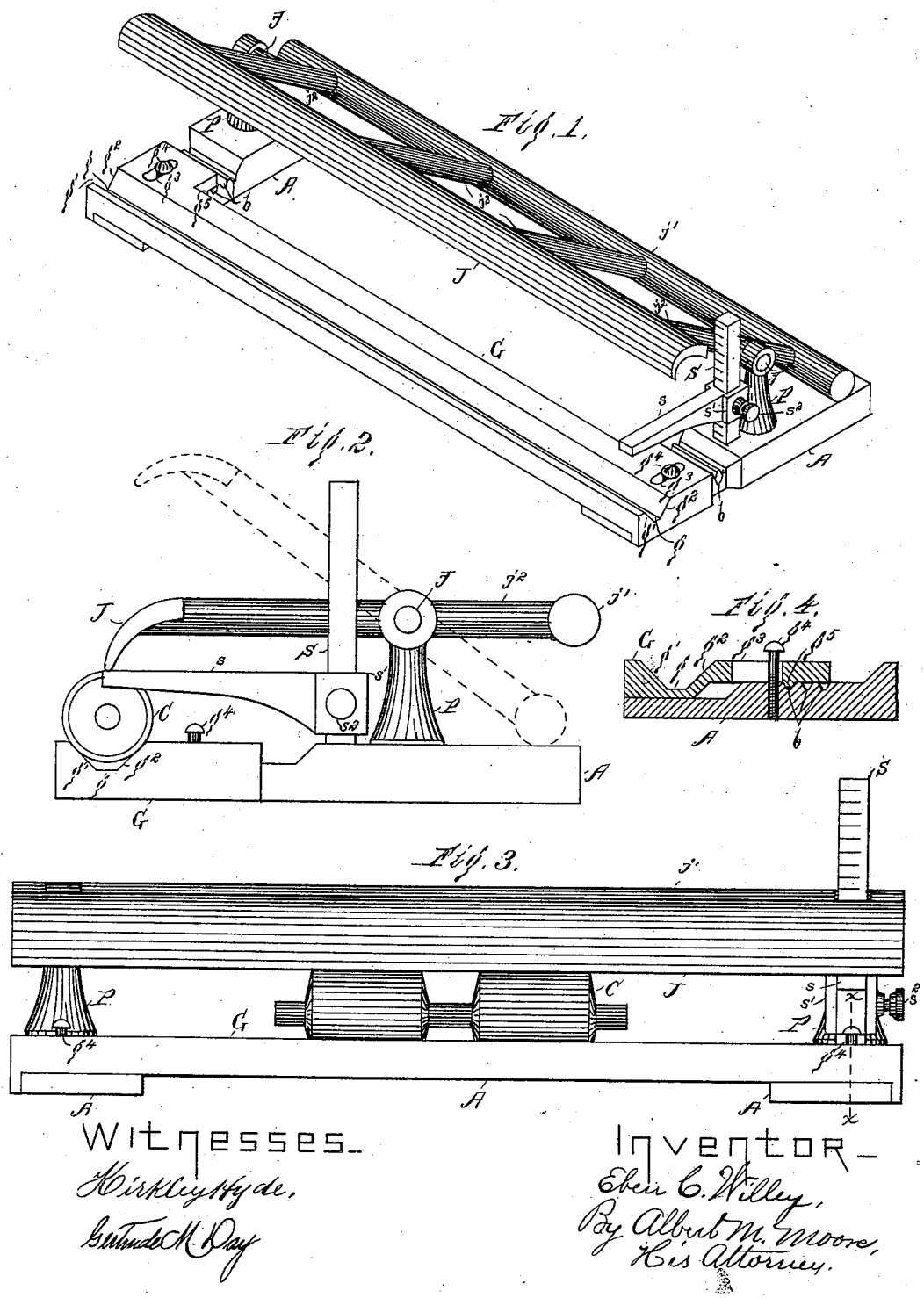

UNITED STATES PATENT OFFICE.

EBEN C. WILLEY, OF MANCHESTER, NEW HAMPSHIRE, ASSIGNOR OF ONE-HALF TO GILBERT P. WHITMAN, OF SAME PLACE.

GAGE FOR MEASURING DIAMETERS OF CYLINDERS.

SPECIFICATION forming part of Letters Patent No. 355,355, dated January 4, 1887.

Application filed September 11, 1886. Serial No. 213,284. (No model.)

*To all whom it may concern:*

Be it known that I, EBEN C. WILLEY, a citizen of the United States, residing at Manchester, in the county of Hillsborough and State of New Hampshire, have invented a certain new and useful Improvement in Gages, of which the following is a specification.

My invention relates to gages; and it consists in the devices and combinations hereinafter described and claimed.

In the accompanying drawings, Figure 1 is an isometric view of a gage constructed according to my invention; Fig. 2, an end elevation of the same and of a cylinder to which the gage is being applied, the dotted lines showing the position of the straight-edge when the gage is not in use; Fig. 3, a front elevation of said gage; Fig. 4, a section on the line $x$ $x$ in Fig. 3 through a part of the bed-plate and gage-trough, showing the means of adjusting the trough on said bed.

The gage hereinafter described is designed to determine the parallelism of opposite sides of bodies of a cylindrical or other shape, and to enable a comparison to be made readily between different bodies as to their thickness.

A is a bed (shown in the drawings as a rectangular frame) adapted to support the other parts of the gage. Upon the bed is supported a gage-trough, G, provided with a longitudinal groove, $g$, having inclined sides $g'$ $g^2$, and adapted to receive the body to be gaged, as shown in Figs. 2 and 3. The gage-trough G is provided near its ends with transverse slots $g^3$, through which vertical screws $g^4$ are driven down into the bed to enable the gage-trough to be adjusted on said bed, as hereinafter described. At each end of the bed are vertical bearing-posts P, in which turn the journals $j$ of the straight-edge J. The straight-edge J is preferably curved downward, as shown, and its front edge is parallel with the gage-trough G. The straight-edge J is provided with a counterbalancing weighted rod, $j'$, to which it is connected by transverse rods $j^2$, the outer of these rods having secured to them said journals $j$.

The method of using the gage is shown in Fig. 2, where C represents a cylinder placed in the gage-trough. When the straight-edge J is brought into contact with the cylinder C, so placed in said trough, if the cylinder be a perfect cylinder, the lower part of the straight-edge proper should be in contact with the cylinder from end to end of the latter.

In Fig. 3 is shown a method of instantaneously comparing the thicknesses or diameters of different cylinders. Obviously, when cylinders of different diameters are placed end to end in the gage-trough G and the straight-edge is brought down over the gage-trough, it can come in contact only with the cylinder of greatest thickness, and the light can be seen between the straight-edge and the cylinders of less diameter.

The gage above described affords a very accurate means of quickly matching cylinders in respect of their thickness, and is particularly useful in matching the top rolls of spinning-frames, mules, and twisters, which rolls are commonly used in pairs, a pair of rolls being secured to a single arbor and pressed downward upon the lower steel rolls by means of a weighted saddle, which presses upon said arbor between said rolls in a well-known manner. Evidently if the rolls of the same pair are of different diameters the outer end of the smaller roll and the inner end of the larger roll will bear upon the lower steel rolls, while the inner end of the smaller top roll and the outer end of the larger top roll will be out of contact with the lower roll and the drawing will be imperfectly accomplished.

At one end of the bed G is a vertical stop-post, S, on which slides a horizontal stop or arm, $s$, provided at its rear end with a collar, $s'$, which embraces said stop-post, and is held at any desired height thereon by means of a set-screw, $s^2$, turning in said collar and thrusting against said post S, said post being graduated, as shown. The arm $s$ projects forward under the front lower edge of the straight-edge J, and serves as a stop to limit the downward motion of said straight-edge and enables one to determine readily whether a top roll or other object has the standard thickness.

As already stated, the position of the gage-trough G on the bed A is adjustable. This is in order that the straight-edge may when in use rest upon the top of the cylinder or other article being gaged, to allow the light to pass horizontally between said straight-edge and said cylinder or other article, provided such cylinder or other article is imperfect. If the straight-edge is depressed just to the horizontal plane which passes through the center of the journals $j$, and the middle line of the groove $g$ of the gage-trough G is placed immediately below the testing-edge of said straight-edge, said testing-edge will be immediately above the axis of a cylinder which just fills the gage; but if the straight edge be depressed below said horizontal plane or raised above said plane, the axis of a cylinder which just fills the gage when so placed will not lie immediately below said testing-edge, because moving said testing-edge away from said horizontal plane in either direction causes said edge to move backward toward the vertical plane which lies in the axis of the journals $j$. The trough G is therefore provided on its under surface at each end with a longitudinal V-shaped rib, $g^5$, and the base A is provided with two or more longitudinal V-shaped grooves, $b$, at each end to receive said rib, the rib being placed in the front groove when gaging the standard article or articles of a size such that the straight-edge when in contact with such articles is depressed to the horizontal plane of the axis of the journals $j$, and said rib being placed in such one of the other grooves $b$ as may be necessary to bring said straight-edge over the axis of the articles being gaged when said articles are larger than or smaller than the standard.

By means of the screws $g^4$ the gage may be firmly held in any position of the bed.

I claim as my invention—

1. The combination of a suitable bed, a gage-trough supported thereon, a straight-edge pivoted above said bed and gage-trough and parallel with said gage-trough, as and for the purpose specified.

2. The combination of a suitable bed, a gage-trough supported upon said bed, a straight-edge pivoted above said bed and parallel with said gage-trough, and a counter-balance to raise said straight-edge away from said trough, as and for the purpose specified.

3. The combination of a suitable bed, a gage-trough adjustable on said bed, a straight-edge arranged above said trough and journaled above said bed to allow said straight-edge to be brought nearer to or farther from said trough, as and for the purpose specified.

4. The combination of the bed, the gage-trough supported thereon and provided near its ends with transverse slots, set-screws driven through said slots into said bed to allow of the adjustment of said trough and to retain the same on said bed, and a straight-edge arranged parallel with said trough and journaled above said bed, as and for the purpose specified.

5. The combination of the bed provided with longitudinal grooves on its upper surface, the gage-trough provided with ribs on its under surface, adapted to enter and fit said grooves, and a straight-edge parallel with said trough, journaled above said bed, as and for the purpose specified.

6. The combination of a horizontal bed, a horizontal gage-trough supported thereby and adjustable thereon, vertical bearing-posts supported by said bed, a straight-edge arranged parallel with said gage-trough, a weighted rod arranged parallel with said straight-edge and connected thereto by other rods, journals arranged to project horizontally from said last-named rods and to turn in said bearing-posts, as and for the purpose specified.

EBEN C. WILLEY.

Witnesses:
 JOHN H. ANDREWS,
 WALLACE B. CLEMENT.